United States Patent
Nyström et al.

(10) Patent No.: US 6,210,651 B1
(45) Date of Patent: Apr. 3, 2001

(54) PROCESS FOR PRODUCING HYDROGEN PEROXIDE

(75) Inventors: Mats Nyström, Ytterby; Johan Wanngård, Angered; Wolfgang Herrmann, Göteborg, all of (SE)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 09/217,585

(22) Filed: Dec. 22, 1998

Related U.S. Application Data

(60) Provisional application No. 60/068,440, filed on Dec. 22, 1997.

(30) Foreign Application Priority Data

Dec. 22, 1997 (EP) .................................................. 97850180

(51) Int. Cl.⁷ .................................................. C01B 15/01
(52) U.S. Cl. .............................................. 423/584
(58) Field of Search .............................................. 423/584

(56) References Cited

U.S. PATENT DOCUMENTS

| | | |
|---|---|---|
| 2,368,640 | 2/1945 | Cook et al. . |
| 4,369,128 | 1/1983 | Moseley et al. . |
| 4,661,337 | 4/1987 | Brill . |
| 4,681,751 | 7/1987 | Gosser . |
| 4,772,458 | 9/1988 | Gosser et al. . |
| 5,128,114 | 7/1992 | Schwartz . |
| 5,180,573 | 1/1993 | Hiramatsu et al. . |
| 5,338,531 | 8/1994 | Chuang et al. . |
| 5,500,202 | 3/1996 | Germain et al. . |

FOREIGN PATENT DOCUMENTS

| | | |
|---|---|---|
| 140403 | 8/1930 | (CH) . |
| 558431 | 9/1932 | (DE) . |
| 0 498 166 A1 | 8/1992 | (EP) . |
| 0 878 235 A1 | 11/1998 | (EP) . |
| WO 97/32811 | 9/1997 | (WO) . |
| WO 97/32812 | 9/1997 | (WO) . |

OTHER PUBLICATIONS

"A Novel Fixed Bed Catalyst for the Direct Combination of H2 and O2 to H2O2", Catalysis of Organic Reactions, by John R. Kosak. Chemical Independence (Dekker), vol. 62, 1995 pp. 115–124, (no month).

*Primary Examiner*—Wayne Langel
(74) *Attorney, Agent, or Firm*—David J. Serbin

(57) ABSTRACT

The invention relates to a process for continuously producing hydrogen peroxide comprising the steps of feeding hydrogen and oxygen containing gas to a reactor provided with a catalyst; contacting the hydrogen and oxygen gas with the catalyst and thereby forming hydrogen peroxide, and; withdrawing hydrogen peroxide containing gas from the reactor; wherein the catalyst comprises a solid catalytically active material at least partially covered with a layer of a stationary phase different from the catalytically active material.

20 Claims, 1 Drawing Sheet

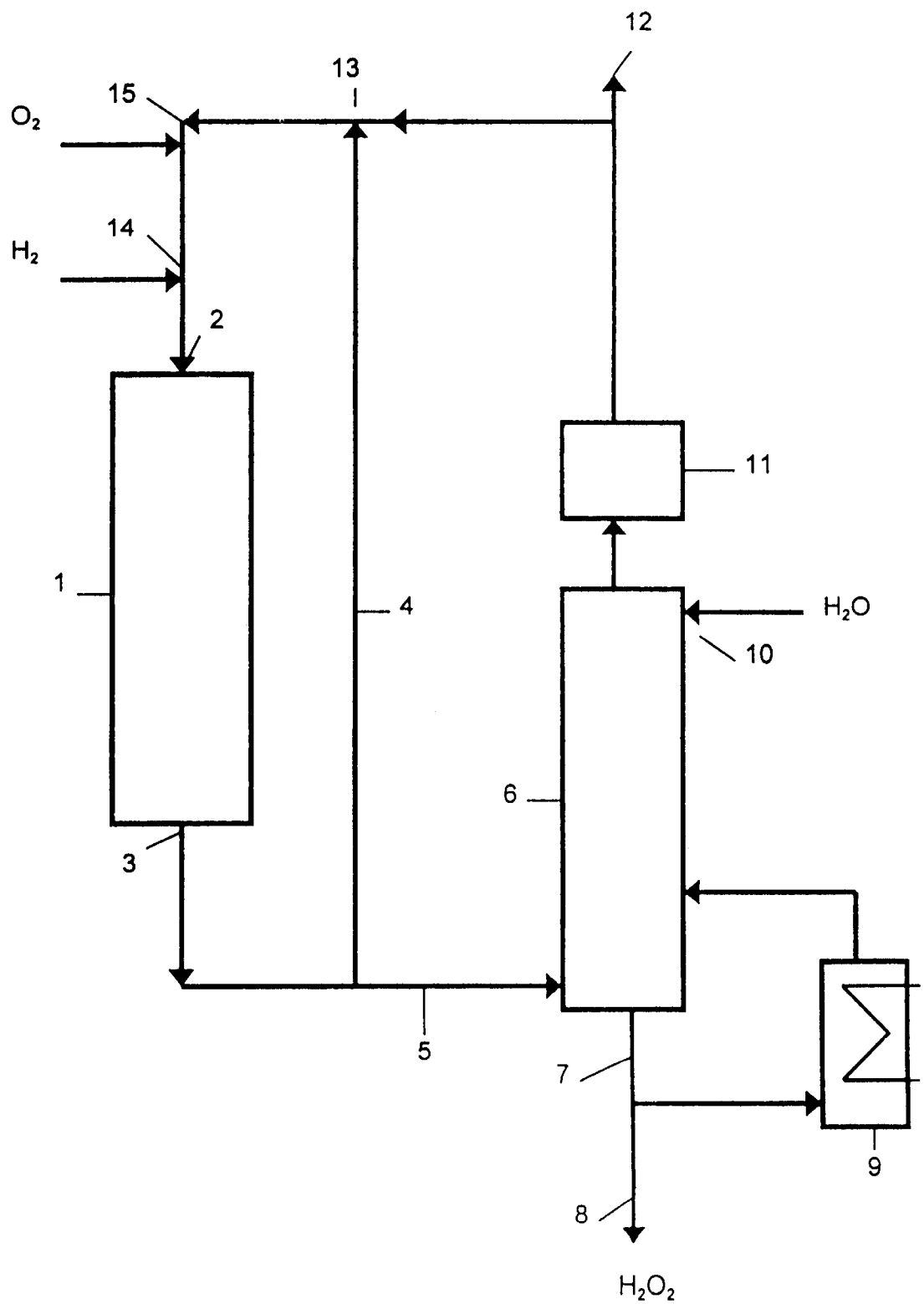

PROCESS FOR PRODUCING HYDROGEN PEROXIDE

RELATED APPLICATIONS

This application claims priority from U.S. Provisional Patent Application No. 60/068,440, filed Dec. 22, 1997, which is incorporated herein by reference.

BACKGROUND OF THE INVENTION

The present invention relates to a process of producing hydrogen peroxide by direct reaction between hydrogen and oxygen in the presence of a catalyst to form hydrogen peroxide gas.

Production of hydrogen peroxide by direct reaction between hydrogen and oxygen can be performed by contacting hydrogen and oxygen with a catalyst in an aqueous reaction medium as described in, for example, U.S. Pat. Nos. 4,661,337, 4,681,751, 4,772,458, 5,180,573, 5,128,114 and 5,338,531, as well as J. R. Kosak (DuPont), "A Novel Fixed Bed Catalyst for the Direct Combination of $H_2$ and $O_2$ to $H_2O_2$", Chem. Ind. (Dekker), 1995, Vol, 62, Catalysis of Organic Reactions.

However, the formation of hydrogen peroxide in these processes is rather slow. Further, it is hard to obtain high concentrations of hydrogen peroxide and the product will also contain additives in the reaction medium as impurities, such as sulfuric acid and/or bromide or chloride ions. These problems are assumed to be due to the facts that only low amounts of the reactants can be dissolved in the reaction medium and that the same catalyst that promotes formation of hydrogen peroxide also catalyses direct formation of water and peroxide decomposition into water and oxygen.

A similar process conducted in an organic solvent as reaction medium is described in WO 97/32811. However, in order to obtain hydrogen peroxide in aqueous solution a separation step such extraction or desorption is necessary.

DE patent 558431, CH patent 140403, U.S. Pat. No. 2,368,640 and WO 97/32812 disclose production of hydrogen peroxide from hydrogen and oxygen in gas phase. However, unless operating under extreme conditions the selectivity is low: instead of hydrogen peroxide a great deal of the end product will be water.

U.S. Pat. No. 5,500,202 discloses production of hydrogen peroxide in a reactor, wherein hydrogen and oxygen are reacted in a gaseous state at the surface of a solid catalyst and the hydrogen peroxide formed is dissolved in a liquid trickling through the reactor. However, also in this process only hydrogen peroxide solutions of low concentration and low purity can be obtained.

SUMMARY OF INVENTION

It has now been found that it is possible to solve these problems and combine the high reaction rate obtained in gas phase with high selectivity by using a special kind of catalyst.

Thus, the invention relates to a process for continuously producing hydrogen peroxide comprising the steps of feeding hydrogen and oxygen containing gas to a reactor provided with a catalyst; contacting the hydrogen and oxygen gas with the catalyst and thereby forming hydrogen peroxide, and; withdrawing hydrogen peroxide containing gas from the reactor. The free volume of the reactor is thus preferably filled with gas comprising hydrogen, oxygen and hydrogen peroxide, and most preferably also inert gas such as nitrogen. The catalyst comprises a solid catalytically active material at least partially covered with a layer of a stationary phase different from the catalytically active material. The stationary phase suitably has a thickness from a mono-atomic or mono-molecular layer up to about 100 $\mu$m, preferably from about 0.002 up to about 25 $\mu$m, most preferably from about 0.004 up to about 5 $\mu$m. These ranges refer to the mean value of the thickness of the stationary phase, which, for example, can be measured by repeated sputter analysis or be calculated from the formula m/($\rho$ s) where m is the weight of the stationary phase, $\rho$ is the density of the stationary phase and s is the total surface of the substrate (normally the BET surface). If direct measurement of the thickness for some reason is impossible, Preferably, the stationary phase covers substantially all the active sites of the catalytically active material.

BRIEF DESCRIPTION OF THE DRAWING

For a full understanding of the invention, the following detailed description should be read in conjunction with the drawing, which schematically illustrates a preferred embodiment for continuously producing hydrogen peroxide.

DETAILED DESCRIPTION OF THE PREFERRED EMBODIMENTS

Without being bound to any particular theory, it is assumed that the hydrogen and oxygen dissolves in the stationary phase and is transported therein to reach the surface of the catalytically active material on which the reaction to form hydrogen peroxide takes place. The hydrogen peroxide and optionally water are then transported through the stationary phase and released to the gaseous mixture in the reactor, Thus, the stationary phase, which may be liquid or solid, should suitably have capability of dissolving and transporting hydrogen and oxygen from the gaseous environment to the catalytically active material and transporting hydrogen peroxide and preferably also water in the opposite direction, Most preferably, water has higher solubility in the stationary phase than hydrogen peroxide has. Use of such a catalyst enables production of hydrogen peroxide at high reaction rate and selectivity without having to operate at extremely high pressure.

The stationary phase, should preferably have a lifetime of at least 24 hours, most preferably at least 500 hours, under the conditions (temperature, pressure, etc.) prevailing in the reactor. Suitable materials for the stationary phase are preferably sufficiently hydrophilic to show a contact angle less than about 90° and include gums or liquids, preferably organic, with low volatility. The contact angle can be measured with known methods as described in, for example, Surface and Colloid Science, vol. 5, Ed E Matijevic, Wiley Interscience-1972, p 211; Physical Chemistry, W J Moorde, Longmans 1962, p 730. Any material is preferably high boiling, which suitably means that the boiling point at 100 kPa is at least about 100° C., preferably at least about 200° C., most preferably at least about 300° C. The stationary phase may be bound to the catalyst and/or an optional catalyst support with chemical bonding by using for example silanisation reagents. If necessary, it is possible to add small amounts of the material for the stationary phase to the gas stream flowing into the reactor in order to compensate for tosses.

Examples of useful materials for the stationary phase include one or several of the following components in mixed, polymerised or crosslinked forms:

All kinds of hydrocarbons, preferably having from 8 to 30 carbon atoms; polymers such as polyethylene, polypropylene, squalane, squalenes, hydrocarbon oils, hydrocarbon greases, etc.; halogenated hydrocarbons such as fluoro carbons, chlorofluoro carbons etc.; alcohols and polyols such as decanol, cyclohexylmethanol, polyethylene glycol, polyvinyl alcohol etc.; polysiloxanes such as dimethyl polysiloxanes or where the methyl groups are replaced by other groups such as hydrogen, phenyl, vinyl, trifluoropropyl, cyanoethyl cyanopropyl or chlorophenyl; monofunctional silanes $R_1R_2R_3SiX$ where R is for instance hydrogen, alkyl, phenyl, ethers, ester, amid, amine etc. and X is halogen, hydroxyl, ether, amine, amide etc.; polyfunctional silanes $R_{n-1}$-Si-$X_n$, where R and X are groups of the types described above, (for instance trimetoxy methyl silane); monofunctional or polyfunctional silanes crosslinked with for instance oxygen and/or nitrogen containing bonds; polyesters from diols such as ethylene glycol, propylene glycol or from polymerised diols and dicarboxylic acids such as adipinic acid, terephthalic acid or sebacic acid (for example ethylene glycol adipate or ethylene glycol sebacate); polyglycots such as polyethyleneglycols, optionally derivatised in the ends to form ethers of e.g. methanol or esters of e.g. stearic acid, esters of mono- or polyacids such as dinonyl phthalate or dioctyl sebacate; esters of mono-,di- or oligomeric polyhydroxy compounds such as mannitol, pentaeythriol or sorbitol (for example sorbitol stearate, or sucrose acetate or isobutyrate).

Preferred materials for the stationary phase include organic compounds selected from silaneoxanes, silanes, ethers, esters, alcohols, acids, halides and salts thereof. Other preferred materials include organic compounds containing hydroxy groups, halogen groups, carboxylic groups, sulfonic groups, phosphonic groups, amine groups, quaternary ammonium groups, alkoxide groups, metals and/or other polar groups. The compounds may optionally be in polymerised or crosslinked form and/or as salts.

The stationary phase could also be a film or adsorbate of a low boiling liquid such as water or methanol adhered directly to the catalytically active material or to a porous support on thereon.

The stationary phase may also contain additives for improving the selectivity or the reaction rate, such as inorganic or organic acids or halogen compounds, for example sulfuric acid, phosphoric acid, hydrobromic acid, hydrochloric acid, phosphonic acids, sulfonic acids such as hexadecanoic sulfonic acid, or salts thereof.

The catalytically active material may comprise one or more precious metals, preferably selected from group VIII metals or gold, most preferably palladium, platinum or mixtures thereof. Most preferably the active material is a mixture of from about 90 to 100% by weight of palladium and from 0 to about 10% by weight of platinum. The catalytically active material may also be a less active material such as nickel, which in some processes increases the selectivity of the reaction.

The catalytically active material is preferably deposited on a solid support. It has been found that a low total surface area of the catalyst support favours the selectivity of the reaction. Suitably the BET area of the support is below about 100 $m^2/g$, preferably below about 20 $m^2/g$, most preferably below about 10 $m^2/g$, and particularly most preferably below about 1 $m^2/g$. The BET area is preferably at least about 0.00005 $m^2/g$, most preferably about 0.01 $m^2/g$. Suitable materials for the support include, for example, silica, alkali or alkaline earth metal silicate, alumina, carbon, aluminium silicate such as zeolite, carbonates of alkaline earth metals such as magnesium, calcium, barium or strontium, oxides of magnesium, aluminum, titanium or zirconium, or carbides of magnesium, silicon, aluminum, titanium, zirconium, ceramic materials or organic polymers. Preferred organic polymers contain hydroxy groups, carboxylic groups, sulfonic groups, amine groups, quaternary ammonium groups and/or other polar groups. The most preferred support materials are selected from polyfluoro carbons, glass, substantially pure silica, quartz or substantially pure aluminum oxide. Low surface area supports are preferred such as non-porous beads or materials having a surface area below about 10 $m^2$ per gram, most preferably below about 1 $m^2$ per gram. If the support is porous it is preferred that the pores are fairly large and preferably pores with a diameter exceeding about 10 nm, most preferably exceeding about 20 nm constitutes more than about 50%, most preferably about 80% of the total pore volume.

It is also possible to arrange the catalytically active material without a catalyst support. Preferred arrangements of non-supported catalytically active material are in the form of beds of porous particles, porous metal foams or wire cloth.

The catalyst may be in the form of a fixed particle bed, for example with an average particle size from about 0.1 to about 10 mm, preferably from about 0.3 to about 5 mm, in the form of sections of monoliths, in the form of fibres, for example with a diameter from about 1 to about 2000 $\mu$m, or as a fluidized bed for example with an average particle size from about 20 to about 5000 $\mu$m, preferably from about 100 to about 500 $\mu$m. The particles can be spherical or non-spherical and the size is defined as the smallest dimension cross the particle. It is also possible to use a catalyst in the form of a net or a foil.

The catalyst may be prepared with conventional methods. In one method, a solid catalytically active material, optionally deposited on a support, is coated with a material of another phase, such as a high boiling liquid or a gum, to at least partially cover the active sites. The coating can be accomplished with methods known as such, for example in surface modification of fibres, such as vapour deposition, chemical vapour deposition, impregnation, precipitation from a solution, painting, etc. Suitable methods are described in, for example, K. K Unger, Porous silica, J. of Chromatography Library, Vol. 16, Elsevier 1979; Coatings Technology Handbook, Ed D Satas, Marcel Dekker 1991; and Handbook of Deposition Technologies for Films and Coatings. Ed: R Bunshah, Noyes Publishing 1994.

Deposition of catalytically active material on a support can be accomplished by any known method, such as those described in EP 878235 and the earlier mentioned U.S. Pat. No. 5,338,531 and J. R. Kosak (DuPont), "A Novel Fixed Bed Catalyst for the Direct Combination of $H_2$ and $O_2$ to $H_2O_2$", Chem. Ind. (Dekker), 1995, Vol. 62, Catalysis of Organic Reactions.

Although it is possible to operate at a temperature of the gas in contact with the catalyst as low as about 0° C. and as high as about 200° C., the temperature is suitably maintained from about 20 to about 150° C., preferably from about 70 to bout 120° C., most preferably from about 70 to about 100° C. Preferably the temperature should exceed the condensation temperature of hydrogen peroxide and most preferably be at least about 5° C. above said condensation temperature. High temperature is favourable since it is then possible obtain a high concentration of hydrogen peroxide in the gas stream, and less expensive process equipment can then be used. However, the selectivity is lower at too high a temperature. It is normally possible to operate without supplying heat from external sources but only utilising the heat produced by the reaction between hydrogen and oxygen.

In a preferred embodiment, a gaseous reaction mixture containing hydrogen and oxygen is supplied to the reactor through an inlet and hydrogen peroxide enriched gas is withdrawn from the reactor through an outlet. The temperature difference in the gaseous reaction mixture in contact with the catalyst between a position just after the inlet to the reactor and a position at the outlet of the reactor is suitably maintained below about 40° C., preferably below 25° C., most preferably below 15° C. Although it in principle is possible to operate the reactor under substantially isothermic conditions, it is preferred to maintain a temperature of the reaction mixture at the outlet that is at least about 2° C., most preferably at least about 5° C. higher than the temperature at the inlet of the reactor. Suitably the temperature of the reaction mixture is maintained above the freezing point of any component therein, most preferably above −10° C. The pressure is suitably maintained below 100 bar, for example from about 3 to about 70 bar, preferably from about 6 to about 50 bar, most preferably from about 10 to about 20 bar.

The process is suitably carried out by continuously feeding hydrogen and oxygen into a gaseous reaction mixture flowing through the reactor containing a catalyst and obtaining a hydrogen peroxide enriched gas at the outlet of the reactor. The oxygen may be supplied as substantially pure gas or, as preferred, in the form of an oxygen containing gas such as air. Preferably, the reaction mixture contains from about 2 to about 97 mol % of oxygen most preferably from about 4 to about 70 mol %. It has been found that the safety of the process increases if the oxygen concentration is maintained below about 5 mol %. High hydrogen concentration favours the hydrogen peroxide production but may also involve safety problems. Therefore, it is preferred to operate at a hydrogen concentration in the reaction mixture below the detonation limit at about 15 mol %, and most preferred to operate below the explosion limit at about 5 mol %. The minimum concentration of hydrogen in the reaction mixture in the reactor is suitably about 1 mol %, preferably about 2 mol %. If the reaction mixture runs out of hydrogen there is a risk for oxidation and passivation of the catalyst. The process is particularly safe if both the hydrogen concentration and the oxygen concentration in the reactor are below about 5 mol %. It is preferred to operate so to obtain a hydrogen peroxide enriched gas containing more than 0.2 mol %, preferably more than 0.3 mol%, most preferably more than 0.4 mol % of hydrogen peroxide. For safety reasons it is preferred not to exceed about 5 mol % of hydrogen peroxide in the gas. Preferably the process is operated at a limited conversion degree of hydrogen in the reactor to obtain a difference in the percentage of hydrogen in the reaction mixture at the inlet compared to the outlet of the reactor below about 0.7 mol %, most preferably below about 0.4 mol %, but preferably at least about 0.01 mol %, most preferably at least about 0.07 mol %. For example, if the hydrogen concentration at the inlet of the reactor is 3.50 mol % the concentration at the oulet is preferably from 2.8 to 3.49 mol %, most preferably from 3.1 to 3.43 mol %. In addition to hydrogen, oxygen and hydrogen peroxide the reaction mixture normally contains nitrogen and/or other substantially inert gases.

The process suitably comprises a step of treating at least a portion of the hydrogen peroxide enriched gas from the outlet of the reactor to recover hydrogen peroxide and preferably also cool the gas and then recirculating it back to the reactor. The absolute pressure of the gas during this treatment should preferably deviate with less than about 25%, most preferably with less than about 15% from the absolute pressure of the gas in the reactor which saves energy and investment costs for compressing the hydrogen peroxide enriched gas. Most preferably the treatment is performed at substantially the same pressure as maintained in the reactor. The hydrogen peroxide may be recovered from the gas by cooling condensation and/or absorption in any suitable solvent such as water or an aqueous hydrogen peroxide solution. This liquid may contain small amounts of conventional additives in order to prevent decomposition of hydrogen peroxide. Preferably the gas is treated with an aqueous medium wherein absorption of hydrogen peroxide and cooling occurs simultaneously. A high degree of cooling enables production of more concentrated hydrogen peroxide solution and the temperature difference between treated and untreated gas is preferably from about 20 to about 120° C., most preferably from about 40 to about 100° C. Normally it is possible to obtain an aqueous solution containing up to about 90 weight %, preferably from about 20 to about 70 weight % of hydrogen peroxide and very low amounts of impurities, which eliminates the need for distillation or other expensive steps of further concentrating the product.

In on-site production of hydrogen peroxide it is possible dispense with the above recovery step and react hydrogen peroxide gas with any suitable agent directly in a medium where it is intended to be used.

It has been found possible to maintain a sufficiently low temperature difference within the reaction mixture by leading thermal energy produced during the reaction between hydrogen and oxygen from the hydrogen peroxide enriched gas at the outlet of the reactor to the reaction mixture before it enters or when it just has entered the reactor. This can be achieved in several ways as will be described below In one embodiment, enabling both stable operation of the process and production of hydrogen peroxide at high concentrations without using equipment of extremely large dimensions, the process comprises a step of recirculating a portion of the hydrogen peroxide enriched gas from the outlet of the reactor, preferably from about 40 to about 95%, most preferably from about 60 to about 90%, back to the reactor without recovering hydrogen peroxide therefrom and preferably without cooling the gas, thereby leading thermal energy produced during the reaction back for heating the reaction mixture enterng the reactor. The recirculating gas may, if necessary, be cooled with an external cooling medium, but normally it is preferred just to mix that gas with a portion of or all the cooled gas from a hydrogen peroxide recovery step to form a reaction mixture and then introduce that mixture into the reactor. As an alternative or as a complement, cooled gas from a hydrogen peroxide recovery step may also be added to the reaction mixture by introducing it directly into the reactor at one or several feed points along the reactor and/or between separate sections of the reactor. Fresh hydrogen and oxygen or oxygen containing gas may be added into any of the gas streams, although addition to the reaction mixture just before it enters the reactor is preferred.

In another embodiment cooling can be arranged by letting the gas pass through a sequence of modules each comprising a catalyst bed and one or several of the following functions: cooling zone (direct or indirect), absorption zone and feed zone of hydrogen and/or oxygen. The latter function serves the purpose of reducing the total circulation gas flow. Suitably the number of modules are from 2 to about 100, preferably from about 4 to about 15 and the gas from the last module is preferably recirculated back to the first one.

It has also been found that use of a fluidized bed of catalyst particles facilitates stable operation since part of the heated particles in the fluidized bed are recirculating within the reactor to lead thermal energy from the hydrogen peroxide enriched gas at the outlet to the cooler reaction mixture entering the reactor is significantly cooler than the reaction mixture already in contact with the catalyst. It is possible to operate a fluidized bed at a higher conversion degree of hydrogen than in other types reactors. Preferably the difference in the percentage of hydrogen in the reaction mixture at the inlet compared to the outlet of the reactor is from about 0.3 to about 3 mol %, most preferably about 0.6 to about 2 mol %.

Low temperature gradients within the reaction mixture can also be achieved in a reactor having a fixed catalyst bed made up of particles, fibres or sections of monoliths if the bed has sufficiently high heat conductivity for leading thermal energy back from the part of the bed close to the outlet of the reactor back to the beginning of the bed, particularly if the reactor is comparatively short, for example below about 0.5 m, preferably below about 0.1 m. Also these kinds of reactors can be operated at a comparatively high conversion degree of hydrogen. Preferably, the difference in the percentage of hydrogen in the reaction mixture at the inlet compared to the outlet of such a short reactor is from about 0.3 to about 3 mol %, most preferably about 0.6 to about 2 mol % compared to reactor inlet.

Besides adiabatic operation, cooling can also be achieved by releasing reaction heat from the catalyst to the adjacent gas stream or cooling by deposition of the catalyst on the wall of a heat transfer surface, directly chilled with a circulating cooling medium such as water, e.g. from the other side. This concept offers good temperature control.

The reactor may, if necessary, comprise means for cooling the gaseous reaction mixture with an external cooling medium. It is then preferred to maintain a temperature difference between the cooling medium and the reaction mixture below about 40° C., preferably below about 25° C., most preferably below about 15° C. If necessary, it is also possible to further heat the reaction mixture before it enters the reactor.

The invention will now be further described in connection to the FIGURE schematically showing a preferred embodiment.

A gaseous reaction mixture having a preferred temperature of about 90–100° C., an absolute pressure of about 13–17 bars and preferably comprising about 40–60 mol % oxygen, about 34 mol % hydrogen and about 0.7–1.1 mol % hydrogen peroxide, the balance preferably being nitrogen and/or other inert gases, is introduced into a reactor 1 at an inlet 2. In the reactor 1 the reaction mixture is contacted with a catalyst wherein oxygen and hydrogen reacts to hydrogen peroxide. At an outlet 3 gas preferably containing about 0.8–1.2 mol % hydrogen peroxide leaves the reactor 1 and is then divided into one recirculation line 4 and one line 5 leading to a combined cooler and absorber 6. Preferably about 10–20% of the gas from the reactor 1 is transferred to the absorber 6 in which it is contacted with water absorbing the hydrogen peroxide while unreacted hydrogen, oxygen and inert gases pass through the absorber 6. An aqueous solution of hydrogen peroxide is circulating through line 7 and a cooler 9. A part of the circulating hydrogen peroxide solution is withdrawn as a product 8 while the remaining solution is recirculated to the absorber 6. Fresh water 10 is supplied at the top of the absorber 6. The gas passing through the absorber 6 is preferably cooled therein to about 40–60° C. and is then conducted through a demister 11. Finally te cooled gas is mixed at a mixing point 13 with the gas from the circulation line 4 and supplied with make up hydrogen 14 and oxygen 15 to form a reaction mixture which is introduced into the reactor 1 at the inlet 2. If any inert gas is fed together with the make up hydrogen 14 or oxygen 15 a corresponding amount of gas should be withdrawn through line 12 situated after the demister 11 but before the mixing point 13.

The process is further described through the following Example which, however, does not limit the scope of the invention.

EXAMPLE

A 20×5×0.11 mm PTFE foil was coated with a 50 nm thick palladium layer by vapour deposition at vacuum. The palladium coated foil was then subjected to a gas mixture of tetramethyl silane, oxygen and argon (molar ratio 1:5:5) in a high frequency field at vacuum which resulted in deposition of a 10 nm thick layer of siloxane completely covering the palladium. The hydrophocity, which depends on the number of oxygen crosslinks, was determined by measuring the contact angle. The catalyst was tested in a 750×6.3 mm cylindrical reactor into which a gas mixture of 3 mol % hydrogen, 50 mol % oxygen and 47 mol % nitrogen was fed at 30 N liter/h and at an absolute pressure of 15 bars. Before enterng the reactor the gas was bubbled through an aqueous bath containing 1 wt % $H_2SO_4$ and 20 wt ppm NaBr at 50° C. The gas at the exit of the reactor was bubbled through an aqueous bath of 1 wt % $H_2SO_4$ to absorb the hydrogen peroxide therein.

Run 1: A catalyst with a contact angle of 45° was used at 75° C. and after 220 minutes operation 0.2 Mg $H_2O_2$ had formed.

Run 2: The same catalyst was immersed 5 minutes in a solution of 1 wt % $H_2SO_4$ and 20 wt ppm NaBr before starting the process. After 180 minutes operation at 45° C. 0.4 mg $H_2O_2$ had formed.

What is claimed is:

1. A process for continuously producing hydrogen peroxide comprising the steps of feeding hydrogen and oxygen containing gas to a reactor provided with a catalyst; contacting the hydrogen and oxygen gas with the catalyst and thereby forming hydrogen peroxide, and; withdrawing hydrogen peroxide containing gas from the reactor; wherein the catalyst comprises a solid catalytically active material at least partially covered with a layer of a stationary phase of solid or liquid different from the catalytically active material.

2. A process as claimed in claim 1, wherein the stationary phase covers substantially all the active sites of the catalytically active material.

3. A process as claimed in claim 1, wherein the stationary phase has a thickness from a mono-atomic or mono-molecular layer up to about 100 μm.

4. A process as claimed in claim 3, wherein the stationary phase has a thickness from about 0.002 up to about 25 μm.

5. A process as claimed in claim 1, wherein the stationary phase is liquid or solid and has a capability of transporting hydrogen and oxygen from the surrounding environment to the catalytically active material and hydrogen peroxide from the catalytically active material to the surrounding environment.

6. A process as claimed in claim 1, wherein water has higher solubility in the stationary phase than hydrogen peroxide has.

7. A process as claimed in claim 1, wherein the stationary phase is sufficiently hydrophilic to show a contact angle less than about 90°.

8. A process as claimed in claim 1, wherein the stationary phase is selected from the group consisting of gums and liquids having a boiling point at 100 kPa of at least about 100° C.

9. A process as claimed in claim 1, wherein the stationary phase is selected from the group consisting of organic compounds containing hydroxy groups, halogen groups, carboxylic groups, sulfonic groups, phosphonic groups, amine groups, quaternary ammonium groups, alkoxide groups, metals, other polar groups and combinations thereof.

10. A process as claimed in claim 9, wherein the stationary phase is selected from the group consisting of organic compounds containing hydroxy groups, halogen groups, carboxylic groups, sulfonic groups, amine groups and quaternary ammonium groups.

11. A process as claimed in claim 1, wherein the stationary phase comprises an organic compound selected from the group consisting of silaneoxanes, silanes, ethers, esters, alcohols, acids, halides and salts thereof.

12. A process as claimed in claim 1, wherein the catalytically active material comprises one or more precious metals selected from the group consisting of group VIII metals and gold.

13. A process as claimed in claim 1, wherein the catalytically active material is deposited on a solid support having a BET surface below 100 $m^2/g$.

14. A process as claimed in claim 13, wherein the solid support has a BET surface below 20 $m^2/g$ but at least 0.0001 $m^2/g$.

15. A process as claimed in claim 1, wherein the support is selected from the group consisting of polyfluoro carbons, glass, substantially pure silica, quartz and substantially pure aluminum oxide.

16. A process as claimed in claim 1, wherein the absolute pressure in the reactor is from about 3 to about 70 bar.

17. A process as claimed in claim 16, wherein the absolute pressure in the reactor is from about 10 to about 20 bar.

18. A process as claimed in claim 1, wherein the temperature in the reactor is from about 20 to about 150° C.

19. A process as claimed in claim 1, wherein the hydrogen concentration and the oxygen concentration in the reactor is below about 5 mol %.

20. A process as claimed in claim 1, wherein the stationary phase, has a lifetime of at least 24 hours, and has capability of transporting hydrogen and oxygen from the gaseous environment to the catalytically active material and transporting hydrogen peroxide in the opposite direction.

* * * * *